Aug. 25, 1970     O. ECKERLE     3,525,581
WEAR AND TEAR-COMPENSATING HIGH-PRESSURE GEAR PUMP
Filed Aug. 29, 1968     5 Sheets-Sheet 1
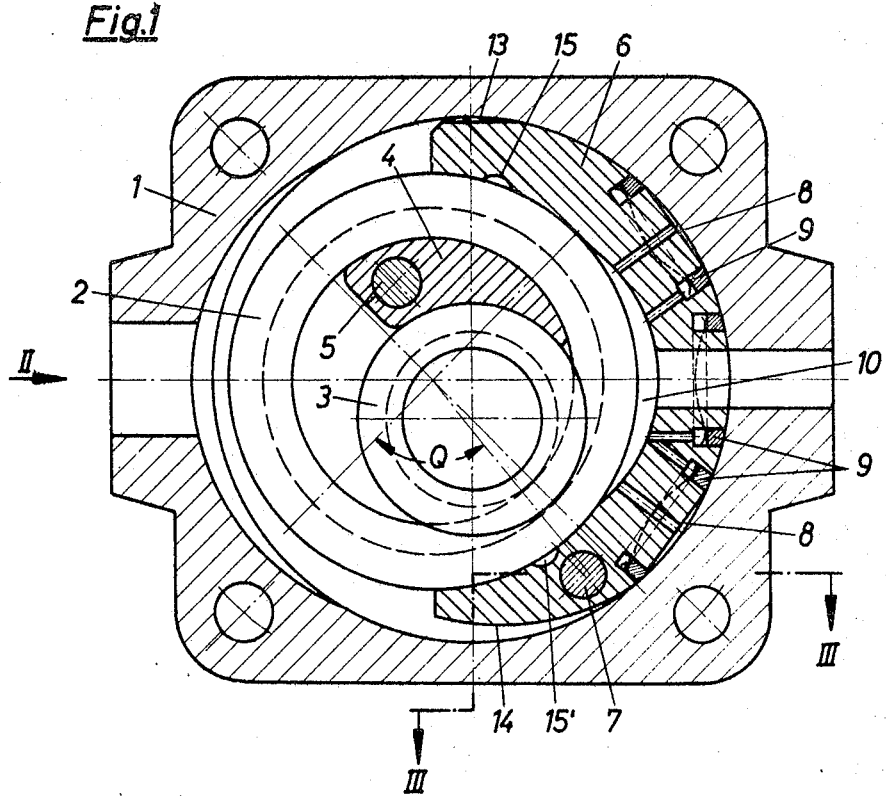
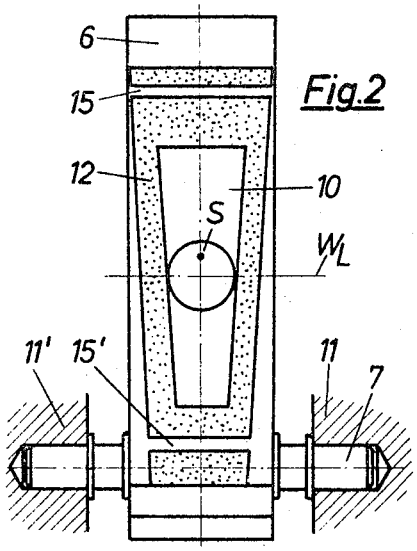
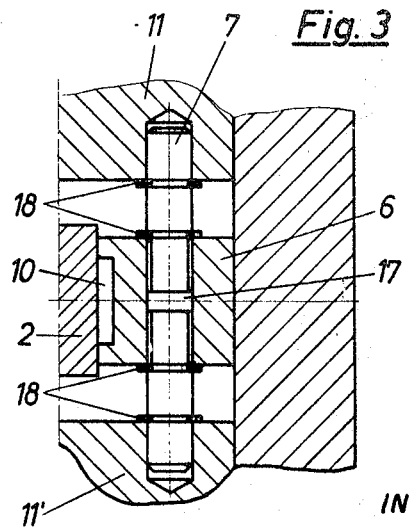
INVENTOR
Otto Eckerle
BY *Otto John Munz*
ATTORNEY Aug. 25, 1970  O. ECKERLE  3,525,581
WEAR AND TEAR-COMPENSATING HIGH-PRESSURE GEAR PUMP
Filed Aug. 29, 1968  5 Sheets-Sheet 2

INVENTOR
Otto Eckerle
BY
ATTORNEY

INVENTOR
Otto Eckerle

BY Otto John Munz.

ATTORNEY

Aug. 25, 1970     O. ECKERLE     3,525,581
WEAR AND TEAR-COMPENSATING HIGH-PRESSURE GEAR PUMP
Filed Aug. 29, 1968     5 Sheets-Sheet 4
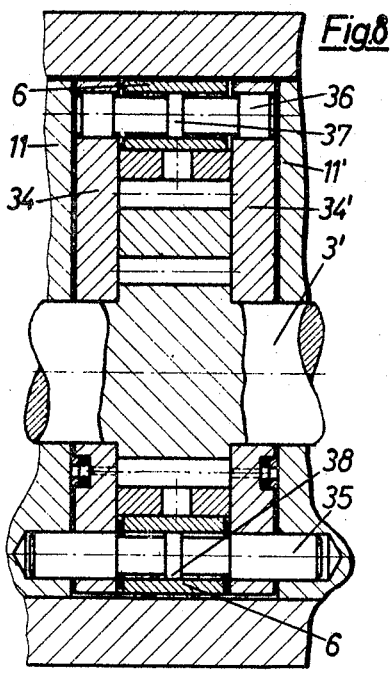
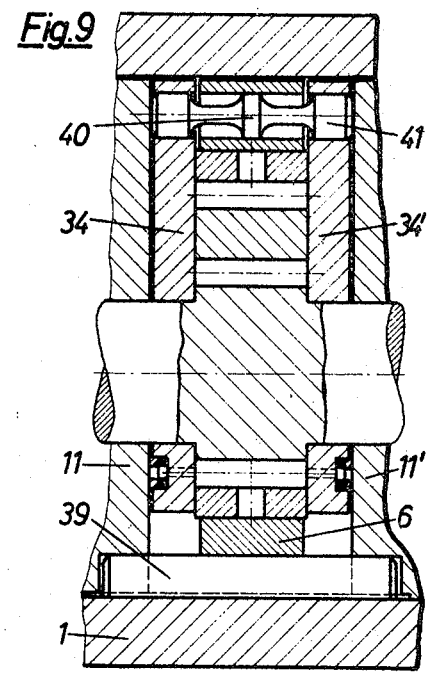
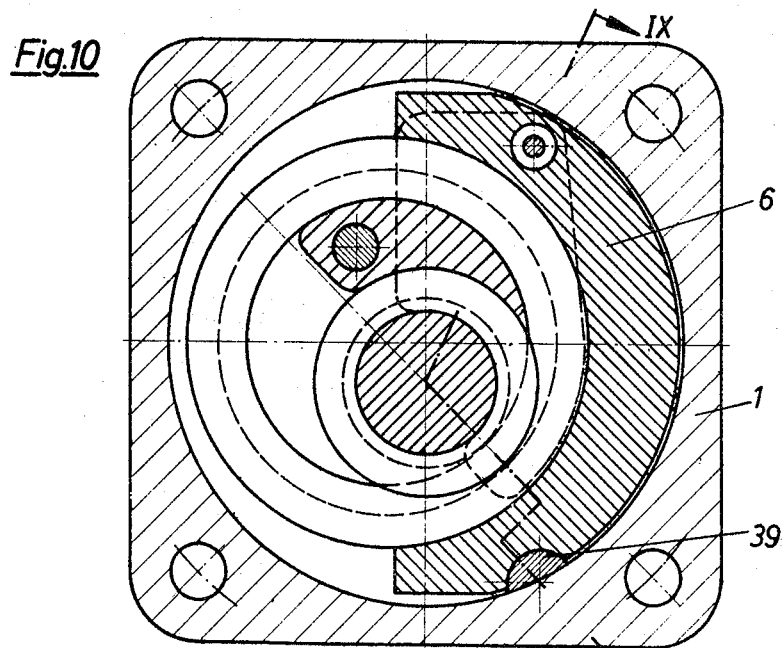
INVENTOR
Otto Eckerle
BY     ATTORNEY

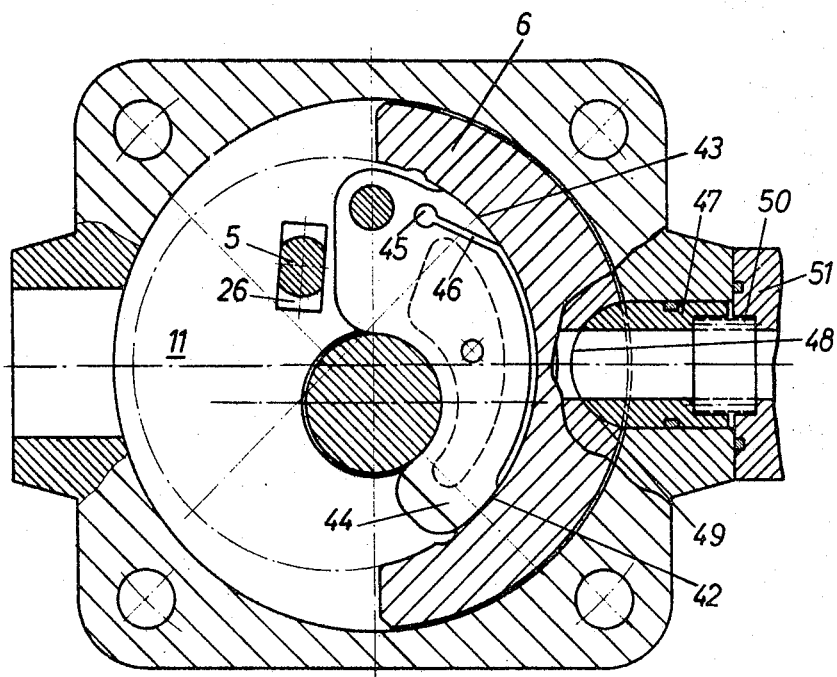

United States Patent Office 3,525,581
Patented Aug. 25, 1970

3,525,581
WEAR AND TEAR-COMPENSATING HIGH-PRESSURE GEAR PUMP
Otto Eckerle, Malsch, Am Bergwald 3, Germany
Filed Aug. 29, 1968, Ser. No. 756,169
Claims priority, application Germany, Sept. 1, 1967,
1,653,827
Int. Cl. F04c *1/06*
U.S. Cl. 418—126                                        12 Claims

ABSTRACT OF THE DISCLOSURE

Wear and tear-compensating heavy-duty gear pump comprising a driven externally-geared pinion, a concomitantly rotating internally-geared wheel, a movable sickle-shaped filler member between the pinion and the internal gear, and either one or two axial disks laterally covering the gears, as well as an insert member called "control piston" being disposed on the pressure side of the gears and radially displaceably arranged with respect thereto, enclosing the outer circumferential surface of the internal gear within a specific angular range and touching the latter as the sole stator part, said control piston containing the first portion of the pressure outlet duct, being relieved for the major part with respect to radial forces and hence pressing against the circumference of the internal gear with only a limited excess force, characterized in that the control piston (6) is rotatably but not displaceably positioned in proximity to the tooth engagement of the two gears (2, 3), that the center of rotation is disposed outside of the relieving field (12) being under pressure between the internal gear (2) and the control piston, and in that the relieving field is so provided that the surface center of gravity (S) thereof is positioned above the line of application or effective curve ($W_L$) of the radial compensating forces.

BACKGROUND OF THE INVENTION

Field of the invention

The present invention relates to a wear and tear-compensating high-pressure gear pump comprising a driven externally-geared pinion, a concomitantly rotating internally-geared wheel, a movable sickle-shaped filler member between the pinion and the internal gear, and either one or two axial disks laterally covering the gears, as well as an insert member called "control piston" being disposed on the pressure side of the gears and radially displaceably arranged with respect thereto, enclosing the outer circumferential surface of the internal gear within a specific angular range and touching the latter as the sole stator part, which control piston contains the first portion of the pressure outlet duct, is relieved for the major part with respect to radial forces and hence presses against the circumference of the internal gear with only a limited excess force.

DESCRIPTION OF THE PRIOR ART

In the known pumps of this type, the internal gear is supported, on the one hand, in tooth engagement in the flanks of the pinion and, on the other hand, with its addendum circle diameter on the movably disposed filler member. The gears rotate therefore without flank clearance and must be manufactured with extreme precision.

SUMMARY OF THE INVENTION

The present invention maintains the feature regarding the support of the internal gear with its addendum circle diameter on the filler member whereas the support of the internal gear on the flanks of the pinion shaft in the tooth engagement is dispensed with. Therefore the gears need no longer be made with such accuracy since, in contrast to the known pumps, the gearing rotates with flank clearance.

For this purpose the control piston is rotatably but not displaceably positioned in proximity to the tooth engagement of the two gears, the center of rotation is arranged outside of the relieving field being under pressure between the internal gear and the control piston, and the relieving field is so provided that the center of gravity of its surface is located above the line of application, or effective curve, of the radial compensating forces.

BRIEF DESCRIPTION OF THE DRAWINGS

Several embodiments of the present invention are illustrated in the accompanying drawings, wherein like elements are identified with the same reference numerals.

FIG. 1 is a cross-sectional view through a pump according to the present invention;

FIG. 2 is a top plan view of the control piston in the direction of the arrow II according to FIG. 1;

FIG. 3 is a cross-sectional view taken along line III—III of FIG. 1;

FIG. 8 is a cross-sectional view taken along line VIII—VIII of FIG. 7;

FIG. 9 is a modified embodiment of FIG. 8 in a cross-sectional view taken along the line IX–IX of FIG. 10;

FIG. 10 is a cross-sectional viewt taken along line X–X of FIG. 9, and

FIG. 11 is a further modified embodiment of FIG. 6.

DESCRIPTION OF THE PREFERRED EMBODIMENTS

Figure 4:
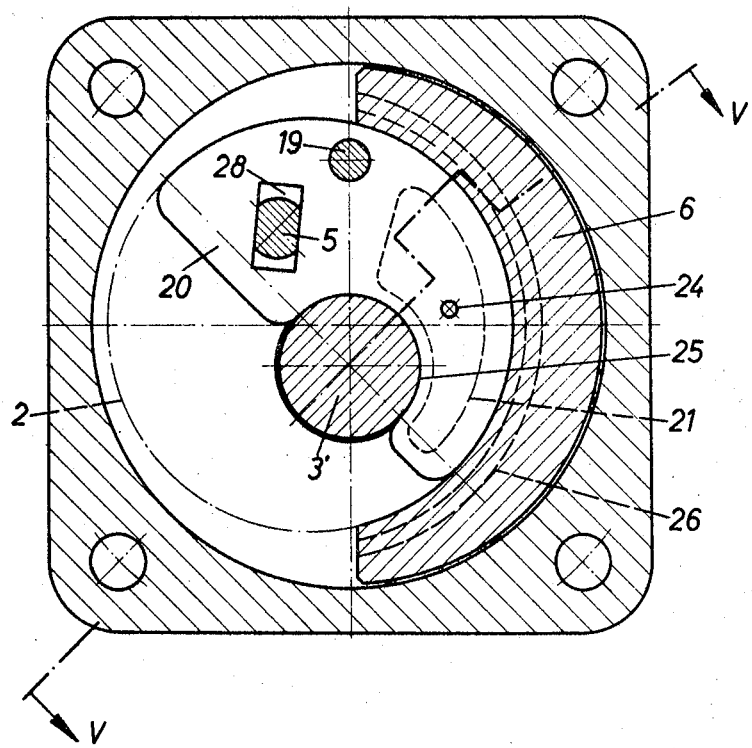
FIG. 4 illustrates a further pump in a cross-sectional view.

The pump shown in FIGS. 1 to 3 consists of the housing 1, the internal gear 2 rotating with the driven pinion 3, and the sickle-shaped filler member 4 which is movably positioned on the bolt 5. Disposed in the eccentrically provided housing 1 between the internal gear 2 and the housing bore is the control piston 6 which is rotatably but not displaceably positioned, by means of a pin 7, in proximity to the tooth engagement within the angular range Q. Pressure fields 8 which are delimited by ring pistons 9 and are slightly greater in the sum total thereof than the pressure forces acting from within upon the internal gear 2 are disposed at the outside diameter of the control piston 6.

These pressure fields rotate the control piston 6 about the pin 7 which presses the internal gear 2 with a small amount of force upon the movably disposed filler member 4. The filler member 4 moves toward the pinion 3 until abutment or bearing contact is achieved. The circumferential gaps are thus compensated. A relieving field 12 disposed between the control piston 6 and the internal gear 2 is so designed that the internal gear 2 will abut or bear with certainty against the control piston 6, and not in the flanks of the pinion shaft 3'. An arrangement of the center of rotation, represented by the pin 7, on the geometrical axis extending through the two centers of the pinion 3 and the internal gear 2 is not advantageous since, due to the pressure field variations (caused by the different positions of the teeth) within the internal gear 2 at the sealing points at the height of the filler member 4 and in the tooth engagement, a double change of momentum takes place which acts in the same direction and results in greatly fluctuating surface compressions between the addendum circle of the internal gear and the filler member. The center of rotation should be disposed outside of the angular range being charged with pressure, i.e. preferably within the angular range Q. The control piston 6 encloses preferably approximately 180° of the circumference of the internal gear. A stable, vibration-damping positioning of the internal gear is thereby obtained. In order to keep the extent or volume of the relieving field 12 nevertheless within the desired range, transverse grooves 15 and 15' are provided for, which are subjected to suction pressure. The outside diameter of the control piston 6 is reduced at the ends 13 and/or 14 of the control piston so that the compensation not be prevented.

The relieving field 12 and the oil pocket 10 are so designed that the surface center of gravity S is positioned above the line of application or effective curve WL, i.e. outside of the area which is defined by the line of application or effective curve WL and the tooth engagement. As a result, the internal gear 2 will run up with certainty at or against the gliding surface of the relieving field 12 and assure the sealing of the tooth system with flank clearance.

The pin 7 being rotatably positioned in the lateral housing parts 11 and/or 11' assumes not only the rotatable positioning of the control piston 6, but also the axial central fixation thereof. Snap rings 18 which secure the control piston 6 in the central position thereof are provided in perforations or apertures of the pin 7. The pin 7 has a collar 17 in the center thereof. By virtue of the short guidance thereof, the control piston can be aligned toward the internal gear 2 within a limited range. A spherical configuration of the pin 7 can be used to obtain the same purpose.

Figure 5:
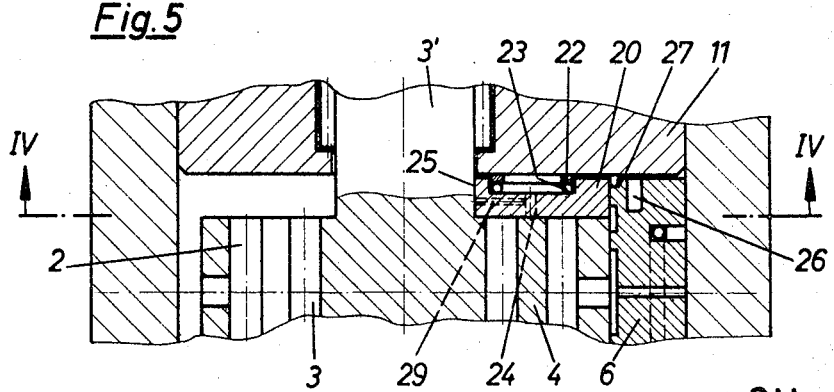
FIG. 5 is a cross-sectional view taken along line V—V of FIG. 4.

In the embodiment shown in FIGS. 4 and 5, a considerable portion of the load which normally acts upon the filler member is transferred from the control piston to the axial disk and the fastening pin thereof, as well as to the pinion shaft.

The control piston 6 is supported on the axial disk 20 which is rotatably positioned about the pin 19 in the housing parts 11 and 11', respectively. Disposed on the side facing away from the gearing is a recess 21 which is supplied with pressure oil from the pressure space via the bore 24, and which is sealed by means of a piston 22 and an O-shaped ring 23.

The axial piston 22 is perforated in the direction toward the axial housing parts 11 and 11', respectively, whereby a hydrostatic relief or balancing of the axial disk 20 both toward the gearing 2, 3, 4 and toward the axial housing parts 11 and/or 11' is effectively obtained. During a movement of the gearing (deflection of the pinion shaft 3'), the control piston 6 is thus adapted at all times to push the axial disk 20 behind the pinion shaft 3. The flank clearance between the pinion 3 and the internal gear 2 is assured by virtue of the fact that the control piston 6 is secured in position within the housing and, respectively, in the housing parts 11 and/or 11' by means of a pin, as shown in FIG. 1 or in FIG. 10. The compression and therewith the wear and tear or abrasion of the internal gear 2 on the filler member 4 may be reduced, in this embodiment, in that a part of the radial charge or load is transferred from the control piston 6 via the axial disk 20 to the pinion shaft 3'. For this purpose it is necessary, however, that the dimensions be accurately coordinated in order to assure both the abutment or bearing contact of the internal gear 2 on the filler member 4 and the abutment or bearing contact of the axial disk 20 on the pinion shaft 3'.

There are two possibilities for solving this problem. The filler member is initially made slightly thicker so that the abutment or bearing contact of the control piston 6, the internal gear 2, the filler member 4 and the addendum circle of the pinion is assured. The pump is fully operative. After a certain running-in abrasion of the filler member 4, the control piston 6 will also make contact with or bear upon the pinion shaft 3' with the axial disk 20. The gliding surface 25 between the axial disk 20 and the pinion shaft 3', and the gliding surface between the filler member 4 and the internal gear 2 will then wear simultaneously. Hence, the surface compressions and the abrasion are considerably lower, while an optimum sealing effect is nevertheless assured.

Another possibility for bridging the tolerances consists in that the support of the control piston 6 is provided so as to be elastic via the axial disks 20. For this purpose, the control piston 6 is equipped with a perforation or aperture 26 so that an elastic collar 27 is formed which presses resiliently on the axial disk 20. In FIG. 4, the movable suspension of the filler member 4 is achieved by means of a bolt 5 upon which the filler member 4 is rotatably mounted. The pin 5 is flangedly connected and glides within a slot 28 of the axial disk 20. This affords the advantage that the axial disk 20 is rotated about the pin 19 due to the filler member load or charge and will come to abut against or bear on the piston shaft 3' even when the filter member 4, during the running-in-period, still assume alone the charge or load from the pressure fields of the control piston 6. It is thereby possible to obtain a feed or pressure lubrication of the gliding surface 25 of the axial disk 20 on the pinion shaft 3' via the bore 24 and the bore 29, without accepting in exchange therefor a greater loss during the running-in period of the pump.

Figure 6:
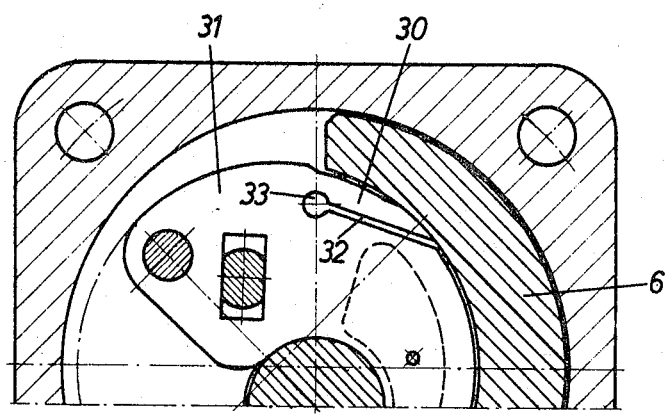
FIG. 6 is a modified embodiment of the pump according to FIG. 4.

FIG. 6 shows a further possibility of the elastic support of the control piston 6 on the axial disk. In this embodiment, the surface element 30 of the axial disk 31 is caused to be elastic by means of the slot 32 and the bore 33. The support of the control piston 6 within the tooth engagement is effected via a pin, as shown in FIG. 1 or in FIG. 10.

Figure 7:
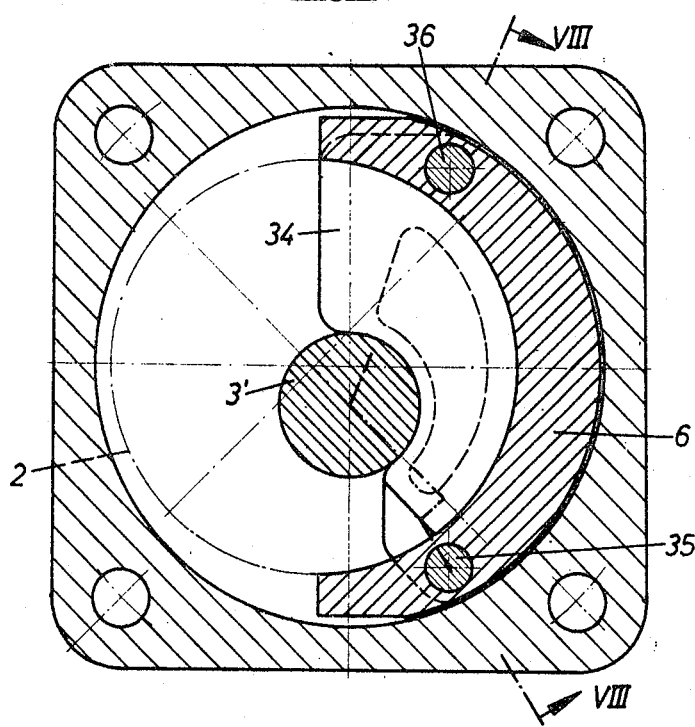
FIG. 7 is a cross-sectional view through another pump.

Another modified embodiment relative to the support of the control piston is illustrated in FIGS. 7 and 8. The control piston 6 and the two axial disks 34 and 34' are rotatably positioned at the pin 35 which engages in the two housing parts 11 and 11'. A second pin 36 connects the control piston 6 with the axial disks 34 and 34' without, however, engaging in the axial housing parts 11 and 11'. The support of the control piston 6 is again effected via the axial disks on the pinion shaft 3'. Both the pin 35 and the pin 36 are preferably provided with a short collar 37 and/or 38 in order not to impair the adjustment or setting of the control piston 6 on the internal gear 2.

FIGS. 9 and 10 represent a similar construction. In this case, a semicircular pin 39 is fixed in the circumferential direction in the axial housing parts 11 and/or 11', this pin bearing on the inner wall of the housing 1. The advantage of this particular provision consists in the stable positioning of the center of rotation for the control piston 6 which is unsusceptible to vibrations. A further noteworthy consideration is the simple solution of the resilient support or seating of the control piston 6 on the axial disks 34 and 34' which is obtained, according to FIG. 9, by means of a markedly attenuated pin 41 on both sides of the collar 40 in the control piston 6.

FIG. 11 illustrates a pump with a further modified embodiment of the radial force compensation. The control piston 6 is supported on two surfaces 42 and 43 on the axial disk, and specifically in tooth engagement on the surface element 42, so that a specific flank clearance is maintained and effectively assured, and on the surface element 43 which is provided so as to be resilient by means of the bore 45 and the slot 46. In this case, the pin 5 serving for the suspension of the filter member engages in a slot 26 in the housing part 11. This has the advantage that the axial compensation is not disturbed by the filler member load or charge.

The suspension of the control piston 6 is accomplished by means of a circular piston 47 which has, at its end on the side of the control piston, a sphere 48 which engages in a corresponding spherical indentation 49 of the control piston 6. This piston 47 secures the control piston 6 in the rotating direction, while a free adjustment of the control piston 6 on the gearing by means of the sphere is nevertheless possible. During the idling motion, a spring 50 which is clamped in between the pressure connection cover 51 and the piston 47 presses this piston and therewith the control piston 6 against the gearing.

The drawings and the foregoing specifications are directed to a machine in which the oil is supplied from the housing via radial bores in the internal gear 2 and via the control piston 6. It is understood, however, that the basic teachings and the solutions proposed hereinabove may also be transferred to and applied for machines having an axial outlet.

Obviously many modifications and variations of the present invention are possible in the light of the above teachings. It is therefore to be understood, that within the scope of the appended claims, the invention may be practiced otherwise than as specifically described.

What is claimed is:

1. Wear and tear-compensating heavy-duty gear pump comprising a driven externally-geared pinion, a concomitantly rotating internally-geared wheel, a movable sickle-shaped filler member between the pinion and the internal gear, and at least one axial disk laterally covering the gears, as well as an insert member called "control piston" being disposed on the pressure side of the gears and radially displaceably arranged with respect thereto, enclosing the outer circumferential surface of the internal gear within a specific angular range and touching the latter as the sole stator part, said control piston containing the first portion of the pressure outlet duct, being relieved for the major part with respect to radial forces and hence pressing against the circumference of the internal gear with only a limited excess force, characterized in that the control piston 6 is rotatably but not displaceably positioned in proximity to the tooth engagement of the two gears 2, 3, that the center of rotation is disposed outside of the relieving field 12 being under pressure between the internal gear 2 and the control piston, and in that the relieving field is so provided that the surface center of gravity S thereof is positioned above the line of application or effective curve $W_L$ of the radial compensating forces.

2. High-pressure gear pump according to claim 1, characterized in that a pin 7 which engages in the axial housing parts 11, 11' is provided within the control piston with spherical means to serve as center of rotation for the control piston 6.

3. High-pressure gear pump according to claim 1, characterized in that the control piston 6 is supported on a semicircular pin 39 which bears on the inner housing wall and is guided in the axial housing parts 11, 11'.

4. High-pressure gear pump according ot claim 1, characterized in that the relieving field 12 in the control piston 6 is provided conical and delimited by two transverse grooves 15, 15' being under suction pressure.

5. High-pressure gear pump according to claim 1, characterized in that the control piston 6 encloses the internal gear 2 within an angular range of approximately 180° and is set off at the ends within the area of the outer circumference see 13, 14.

6. High-pressure gear pump according to claim 1, characterized in that the control piston 6 is supported not only on the internal gear 2 via a collar 27, but also on the lateral axial disks 20 in which latter the filler member bolt 5 is displaceably positioned, the axial disks 20 being rotatably suspended on a pin 19 and bearing on the pinion shaft 3' with a cylindrical gliding surface 25.

7. High-pressure gear pump according to claim 6, characterized in that the collar 27 is made elastic by means of a perforation or aperture 26 in the control piston.

8. High-pressure gear pump according to claim 6, characterized in that the part of the axial disks 31 on which the control piston 6 bears is made elastic by means of a slot 32 changing over into a bore 33.

9. High-pressure gear pump according to claim 6, characterized in that the filler member 4, when new, has a slightly greater outside diameter than necessary so that the internal gear 2 being pressed on by the control piston 6 will initially run up on the filler member before the axial disks 20, 31 is supported on the platoon shaft 3'.

10. High-pressure gear pump according to claim 6, characterized in that the control piston 6 is supported on the pinion shaft via a pin and via the axial disks 34, 34'.

11. High-pressure gear pump according to claim 6, characterized in that the control piston 6 is supported on the axial disk 44 both in the area of the tooth engagement and also at the opposite end via two surfaces 42, 43.

12. High-pressure gear pump according to claim 1, characterized by a central piston 47 being guided in the housing 1 and loaded by a spring 51, said piston being provided at the inner end thereof with a spherical surface 48 engaging in a spherical indentation 49 of the control piston 6.

References Cited

UNITED STATES PATENTS

| | | |
|---|---|---|
| 1,719,639 | 7/1929 | Wilsey. |
| 3,273,502 | 9/1966 | Martz. |
| 3,289,599 | 12/1966 | Eckerle et al. |
| 3,315,608 | 4/1967 | Eckerle. |
| 3,315,609 | 4/1967 | Eckerle. |

DONLEY J. STOCKING, Primary Examiner

W. J. GOODLIN, Assistant Examiner

U.S. Cl. X.R.

418—169